US009367813B2

(12) United States Patent
Jung et al.

(10) Patent No.: US 9,367,813 B2
(45) Date of Patent: Jun. 14, 2016

(54) METHODS AND SYSTEMS FOR IDENTIFYING FREQUENTLY OCCURRING INTRADOMAIN EPISODES AND INTERDOMAIN EPISODES IN MULTIPLE SERVICE PORTALS USING AVERAGE USER SESSION LENGTH

(75) Inventors: Gueyoung Jung, Rochester, NY (US); Shanmuga-Nathan Gnanasambandam, Victor, NY (US); Andres Quiroz Hernandez, Rochester, NY (US); Zhiguo Li, Yorktown Heights, NY (US)

(73) Assignee: Xerox Corporation, Norwalk, CT (US)

( * ) Notice: Subject to any disclaimer, the term of this patent is extended or adjusted under 35 U.S.C. 154(b) by 331 days.

(21) Appl. No.: 13/284,356

(22) Filed: Oct. 28, 2011

(65) Prior Publication Data

US 2013/0110758 A1 May 2, 2013

(51) Int. Cl.
*G06N 99/00* (2010.01)
*G06N 5/02* (2006.01)
*G06N 5/04* (2006.01)

(52) U.S. Cl.
CPC .............. *G06N 99/005* (2013.01); *G06N 5/025* (2013.01); *G06N 5/04* (2013.01)

(58) Field of Classification Search
CPC ......... G06N 5/025; G06N 5/04; G06F 9/4446
USPC ................................................... 706/47, 58
See application file for complete search history.

(56) References Cited

U.S. PATENT DOCUMENTS

2002/0143925 A1* 10/2002 Pricer ................. G06F 11/3414
                                                    709/224
2007/0038599 A1*  2/2007 Pearson .............. G06F 17/3089
2010/0217744 A1*  8/2010 Demirdjian et al. ........... 706/58

OTHER PUBLICATIONS

Masseglia et al., Sequential Pattern Mining, 2005.*
Pablo et al., Sequential Learning for Case-Based Pattern Recognition in Complex Event Domains, Dec. 13, 2011.*
Pei et al., Mining Sequential Patterns by Pattern-Growth: The PrefixSpan Approach, IEEE Transactions on Knowledge and Data Engineering, vol. 16, Issue 11, pp. 1424-1440, Nov. 2004.*
Cooley et al., Web Mining: Information and Pattern Discovery on the World Wide Web, Ninth IEEE International Conference on Tools with Artificial Intelligence, pp. 558-567, Nov. 3-8, 1997.*
Mobasher et al., Creating Adaptive Web Sites Through Usage-Based Clustering of URLs, Proceedings of the 1999 Workshop on Knowledge and Data Engineering Exchange, pp. 7, 1999.*
Harms et alia. Sequential Association Rule Mining with Time Laps. Journal of Intelligent Systems, 22:1, pp. 7-22, 2004.*

(Continued)

*Primary Examiner* — Stanley K Hill
*Assistant Examiner* — Robert H Bejcek, II
(74) *Attorney, Agent, or Firm* — MH2 Technology Law Group LLP

(57) ABSTRACT

Methods and systems for scalable extraction of episode rules using incremental episode tree construction in a multi-application event space comprise compiling events from multiple, different domain logs into a universal log file, rolling domain-dependent and domain-independent windows through the universal log file to identify distinct event-pattern episodes, adding episodes to an episode tree data structure, pruning less frequent episodes from the episode tree, analyzing the episode tree to identify frequent episode rules, and applying the frequent episode rules to future interactions with users.

24 Claims, 11 Drawing Sheets

(56) References Cited

OTHER PUBLICATIONS

Tanasa et alia. Advanced Data Preprocessing for Intersites Web Usage Mining. IEEE Intelligent Systems. Mar./Apr. 2004. pp. 59-65.*

Ivancsy et alia. Frequent Pattern Mining in Web Log Data. Acta Polytechnica Hungarica. vol. 3, No. 1, 2006. pp. 77-90.*

Tanasa, Doru. Web Usage Mining: Contributions to Intersites Logs Preprocessing and Sequential Pattern Extraction with Low Support. Human-Computer Interaction [cs.HC]. Universite Nice Sophia Antipolis, 2005. 169 pages.*

Ramakrishnan Srikant and Rakesh Agrawal, Mining Sequential Patterns Generalizations and Performance Improvements, Extending Database Technology, 1996 (15 pages).

Jian Pei et al., PrefixSpan: Mining Sequential Patterns Efficiently by Prefix-Projected Pattern Growth, International Conference on Data Engineering, 2001 (10 pages).

Heikki Mannila et al., Discovery of Frequent Episodes in Event Sequences, Data Mining and Knowledge Discovery, vol. 1, No. 3, 1997 (31 pages).

* cited by examiner

METHODS AND SYSTEMS FOR IDENTIFYING FREQUENTLY OCCURRING INTRADOMAIN EPISODES AND INTERDOMAIN EPISODES IN MULTIPLE SERVICE PORTALS USING AVERAGE USER SESSION LENGTH

TECHNICAL FIELD

The present disclosure relates generally to methods and systems for analyzing event logs from multiple domains, such as webpage request logs and call center activity logs, to identify frequent patterns of events and to predict future user behavior.

BACKGROUND

Organizations that manage human resources, benefits, financial services, or other services that maintain user data or accounts often provide multiple portals through which users may access, modify, or otherwise interact with their data. For example, a lender that manages student loan accounts may provide a website through which users can view the balances or make payments on their loans. The lender may further maintain a call center to allow users to ask specific questions to customer service representatives or to make similar balance inquiries or payment transactions. In addition, the lender may provide a chat portal through which users can chat with customer service representatives by instant messaging, an email address to which inquires may be sent, a traditional mailing address for receiving paper letters, and other portals. Given recent advances in mobile technologies, the lender may also provide a mobile telephone or tablet application that users may use to perform these and similar tasks.

Often, there is an inverse relationship between a service provider's preference and the user's preference for whether a given portal is used. For example, whereas users generally prefer to have their questions answered by a customer service representative over the phone, service providers generally prefer to address user questions using portals that incur lower operational costs, such as static frequently asked questions (FAQ) webpages or email responses.

One way to minimize the use of more expensive portals without directly restricting users' options is to preemptively "push" information to users, or take other preemptive action, before users might otherwise call a call center or initiate a chat session to ask for such information. Pushing information to a user might involve sending a letter by mail, sending an email, or directing the user's browser to a webpage in response to a transaction.

However, in order to determine what kinds of information should be pushed to users and when such information should be pushed, service providers need to be able to discern common user patterns or "episodes." For example, it may be valuable to know that 90% of users who have read a particular FAQ on a website do not place a phone call to the call center to inquire about a particular topic. Or it may be valuable to know that 75% of users who pay off a loan communicate a request (e.g., by email, mail, chat, etc.) to the lender within 10 days requesting a formal letter from the lender acknowledging payment in full of the loan. By learning such information, the lender can adjust its procedures to, for example, always send a payoff letter within 2 business days of a loan being paid off, and thus to avoid the need to handle another user inquiry. Service providers may be interested in determining common event patterns for many additional reasons, such as determining whether a particular program or service has been, effective, directing user inquiries to appropriate personnel, and providing useful statistics about user behavior.

Typically, service providers attempt to piece this kind of information together by maintaining logs for one or more of their portals. For example, a service provider may maintain a webpage request log that records hypertext transfer protocol (HTTP) requests for particular webpages by particular users. Similarly, a call center log may store records reflecting specific interactions that a user has with a call center, such as initiation of a call, various interactive voice response (IVR) options that the user selects, questions or comments that the user makes to a customer service representative, termination of the call, etc. Similar logs may exist for a service provider's chat portal, email portal, mobile application portal, etc.

However, traditional approaches to discovering event patterns in portal logs tend to be very computationally expensive. For example, apriori methods typically operate by iteratively scanning all event sequences and joining each frequent episode with all other episodes to build (k+1)-length episode candidates. Such methods therefore have complexity $O(n^2)$, where n is the number of k-length frequent episodes. Thus, apriori and other scanning methods become infeasible when the size of a given log file becomes very large.

Traditional scanning approaches are also of limited utility in that they are domain-specific. Failure to detect frequent episodes that span multiple domains—e.g., determining that a particular webpage is frequently accessed after a particular transaction is performed on a mobile application—therefore seriously restricts the range of patterns detectable by traditional scanning approaches.

Accordingly, there is a need for methods and systems for detecting frequent episodes across multiple domains in a manner that is both computationally and memory efficient.

SUMMARY OF THE INVENTION

The present disclosure relates generally to methods and systems for detecting frequent episodes across multiple service domains and predicting future user behavior based on the detected episodes.

In one embodiment, events from multiple, different domain logs are collected, converted into a standard format, and stored in a universal log file—e.g., in chronological order. The universal log file is then analyzed to detect frequent episodes, both specific to individual domains ("intradomain episodes") and across multiple domains ("interdomain episodes"). A window size is determined by computing the average length of a user session in the given domain or across multiple domains. The window is then rolled through the entire universal log file. After each new placement of the window, the events in the window are analyzed to detect all distinct one-event episodes, which are added to an episode tree data structure in memory.

Once all distinct one-event episodes have been added to the episode tree and the window has been rolled through the entire universal log file, all one-event episodes having a frequency below a certain threshold are pruned from the episode tree. The part of the universal log file that contains one-event episodes is then analyzed a second time to identify all distinct two-event episodes that begin with an episode remaining on the episode tree. Once all such distinct two-event episodes have been added to the episode tree, all two-event episodes having a frequency below a certain threshold are pruned from the tree. This process continues by identifying all distinct N-event episodes having a certain frequency and incrementing N until no such episodes can be found.

Once the episode tree has been completed, it is analyzed to derive confidence rules describing future user behavior. For example, such rules may indicate the likelihood that a particular three-event episode will occur in the future or, given the occurrence of the particular three-event episode, the likelihood that a particular subsequent event will occur within a particular timeframe. This process may be performed to build an episode tree for each domain (i.e., containing intradomain episodes) and an episode tree that includes interdomain episodes.

Additional objects and advantages of the invention will be set forth in part in the description that follows, and in part will be obvious from the description, or may be learned by practice of the invention. The objects and advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate various embodiments of the invention and together, with the description, serve to explain the principles of the invention. In the drawings.

DETAILED DESCRIPTION

Figure 1:
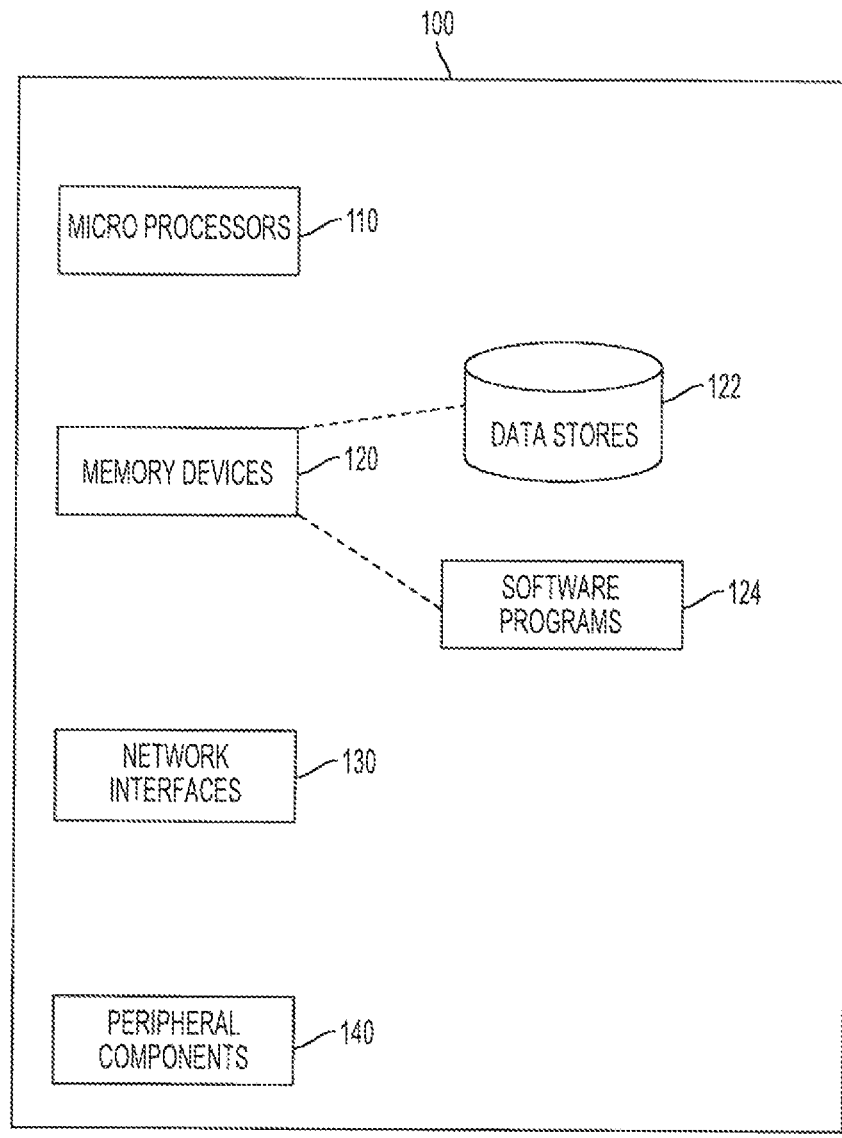
FIG. 1 is a diagram depicting exemplary hardware componentry of a system configured to perform the described embodiments, consistent with certain disclosed embodiments.

The following detailed description refers to the accompanying drawings. Wherever possible, the same reference numbers are used in the drawings and the following description to refer to the same or similar parts. While several exemplary embodiments and features of the invention are described herein, modifications, adaptations, and other implementations are possible, without departing from the spirit and scope of the invention. Accordingly, the following detailed description does not limit the invention. Instead, the proper scope of the invention is defined by the appended claims.

FIG. 1 is a diagram depicting exemplary hardware componentry of a system configured to perform the described embodiments, consistent with certain disclosed embodiments. System 100 may comprise one or more microprocessors 110 of varying core configurations and clock frequencies; one or more memory devices or computer-readable media 120 of varying physical dimensions and storage capacities, such as flash drives, hard drives, random access memory, etc., for storing data, such as images, files, and program instructions for execution by one or more microprocessors 110; one or more network interfaces 130, such as Ethernet adapters, wireless transceivers, or serial network components, for communicating over wired or wireless media using protocols, such as Ethernet, wireless Ethernet, code divisional multiple access (CDMA), time division multiple access (TDMA), etc.; and one or more peripheral components 140, such as keyboards, mice, touchpads, computer screens, etc., for enabling human interaction with and manipulation of system 100. The components of system 100 need not be enclosed within a single enclosure or even located in close proximity to one another.

Memory devices 120 may further be physically or logically arranged or configured to provide for or store one or more data stores 122, such as file systems or relational or hierarchical databases, and one or more software programs 124, which may contain interpretable or executable instructions for performing one or more of the disclosed embodiments. Those skilled in the art will appreciate that the above-described componentry is exemplary only, as system 100 may comprise any type of hardware componentry, including any necessary accompanying firmware or software, for performing the disclosed embodiments. System 100 may also be implemented in part or in whole by electronic circuit components or processors, such as application-specific integrated circuits (ASICs) or field-programmable gate arrays (FPGAs).

Figure 2:
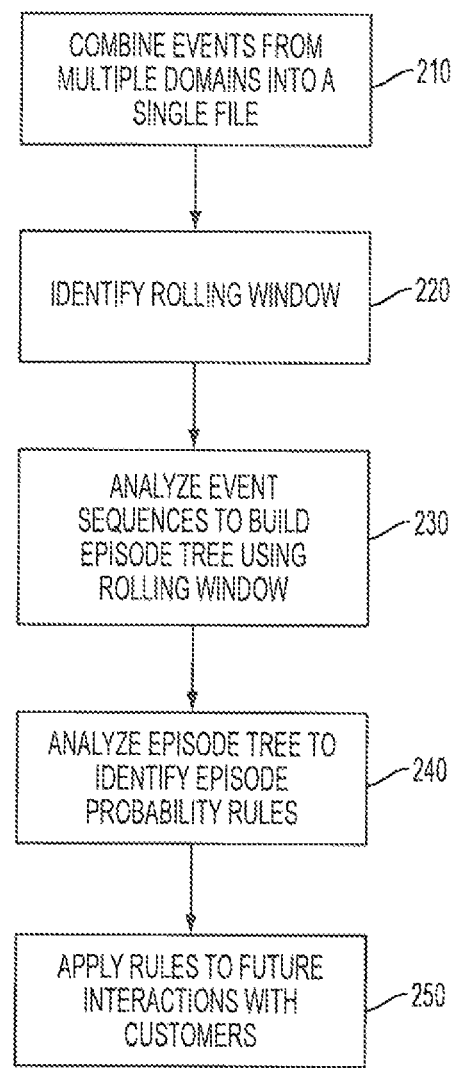
FIG. 2 is a flow diagram depicting an exemplary method of identifying, analyzing, and applying frequent episodes rules across one or more domains, consistent with certain disclosed embodiments.
Figure 3:
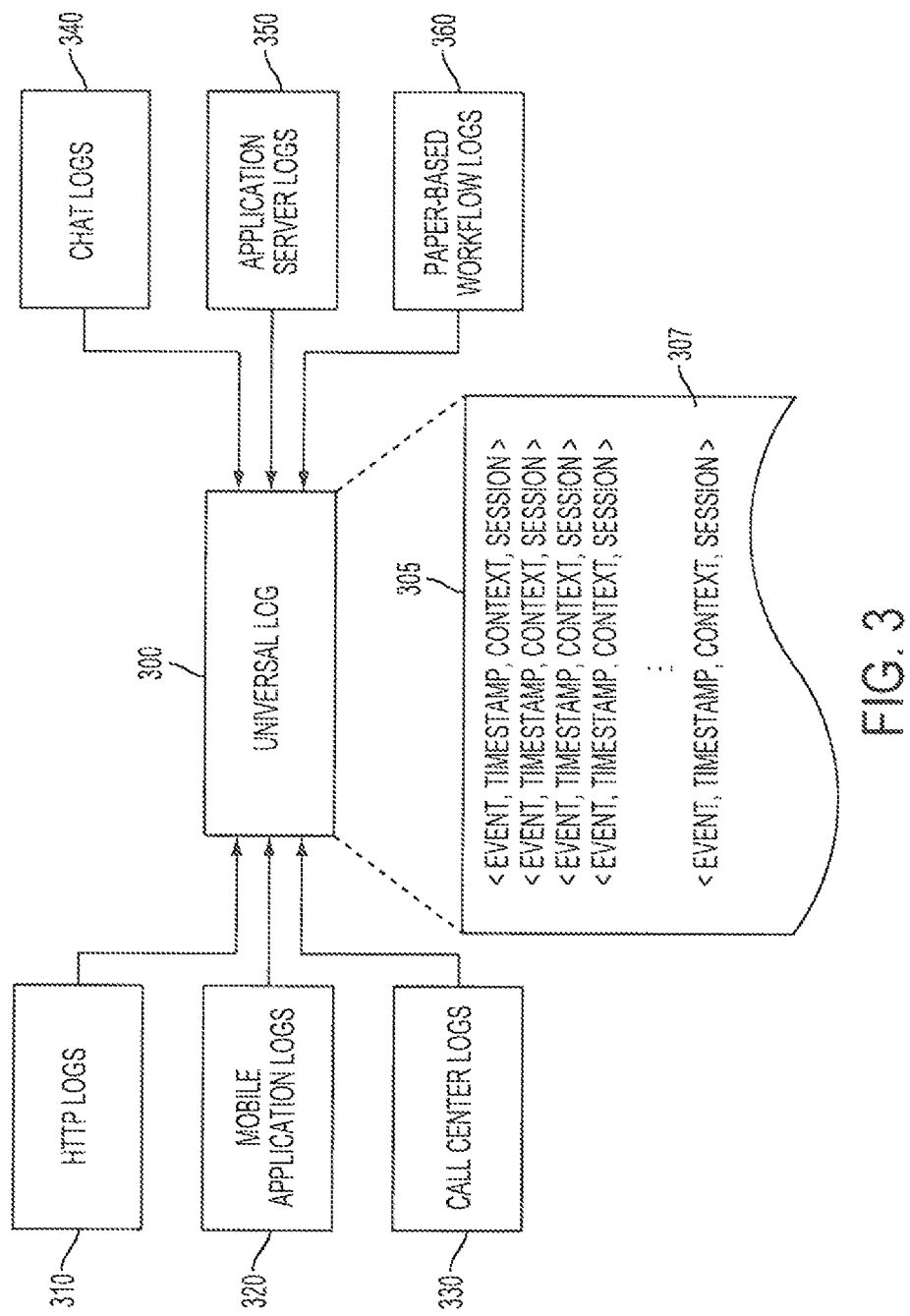
FIG. 3 is a diagram depicting an exemplary process of combining events from multiple, different portal logs into a universal log, consistent with certain disclosed embodiments.

FIG. 2 is a flow diagram depicting an exemplary method of identifying frequent episodes across one or more domains, consistent with certain disclosed embodiments. FIG. 2 presents a high-level overview of five main stages of the overall process. In step 210, system 100 may combine events from multiple domains into a single file. For example, as depicted in FIG. 3, system 100 may combine HTTP Logs 310, Mobile Application Logs 320, Call Center Logs 330, Chat Logs 340, Application Server Logs 350, and Paper-Based Workflow Logs 360 into a Universal Log 300, the contents of which are depicted in excerpt 305. Each of logs 310-360 may be in a different native format specific to their associated portals. Therefore, as part of the combination process, system 100 may convert each data record in each of logs 310-360 into a universal format 307 that is capable of representing an atomic event in any domain.

Once universal log 300 has been created, in step 220, system 100 may identify a suitable rolling window for analyzing the events contained in universal log 300. A window may be determined for each, individual domain, referred to as local window, and another window may be determined for determining episodes across multiple domains, referred to as global window. Because the window concept is closely related to the concept of a session, the concept of the session will now be explained.

In each domain, a session may refer to a series of related events by a single user in the domain. For example, in a web portal, a session may be defined as the set of HTTP requests made by a particular user between the user's logging into the web portal and the user's logging out of the web portal (whether by affirmative action or by automated action, such as an automatic session expiration due to inactivity). Similarly, in an application server log, a session may be defined as the set of actions taken by a user in between the launching of the application and the closing of the application, or in between a particular first communication and a particular second communication between the application and a remote server. In a call center portal, a session may be defined as the set of actions taken by a particular user during a single call, such as the initiation of the call, various IVR options that the user selects, questions or comments that the user makes to a customer service representative, the termination of the call, etc. A chat session may be similar in nature to a call session. Those skilled in the art will appreciate that other kinds of information that may be stored in various domain logs may define sessions within those domains.

Thus, in some embodiments, in each domain, a domain-specific session ("intradomain session") may be defined by the occurrence of certain events, and the session length may vary, both across users and for individual users. For example, a particular user may make two phone calls to a call center portal in one day, the first lasting five minutes and the second lasting two minutes. In this example, the first session may have a length of five minutes and the second session may have a length of two minutes.

In some embodiments, a session that spans multiple domains ("interdomain session") may be defined not by the occurrence of specific events, as in the case of intradomain sessions, but rather by the occurrence of certain time gaps between events. For example, if a user is browsing webpages in a web portal and has a question about a matter relevant to a browsed webpage, the user may call the service provider's call center to speak with a customer representative. Typically, the user will call at a time that is somewhat proximate to the time of the last webpage request (e.g., within 30 minutes). However, if the user calls the call center more than four hours, for example, after the user's last webpage request, then it may be assumed that the user's call is less likely to be related to her web browsing activity. Therefore, an appropriate time gap (e.g., 90 minutes) may be identified such that any user events occurring subsequent to the time gap will not be considered a part of the same interdomain session as user events occurring prior to the time gap.

In order to reduce computational burdens and to identify more meaningful event patterns in the universal log file, system 100 may confine the definition of an episode to only events that occur within the same session, whether intradomain or interdomain. However, because session lengths may vary within the universal log file, even within the same domain or with respect to the same individual user, in some embodiments, a window construct may be used. The window construct operates on the assumption that although some event patterns (i.e., episodes) may be found that span exceptionally long sessions, because exceptionally long sessions are infrequent, those episodes are less likely to reoccur and can thus be ignored. The window may therefore define a ceiling for session lengths within the universal log file.

In some embodiments, a local window may be determined by computing the average length of all sessions within the domain. For example, if all calls last 10 minutes on average, then the window size for the call domain may be 10 minutes. The same may be done for a global window by computing the average length of all interdomain sessions (e.g., which may themselves be demarcated by time gaps). Those skilled in the art will appreciate that other techniques may be used to local and global window lengths.

In step 230, system 100 may build an episode tree by identifying event sequences in the universal log file using a rolling window. This step may be performed both for each domain to identify intradomain episodes and across all domains to identify interdomain episodes. The operations involved in this step are further described in the context FIGS. 4-11.

Figure 5:
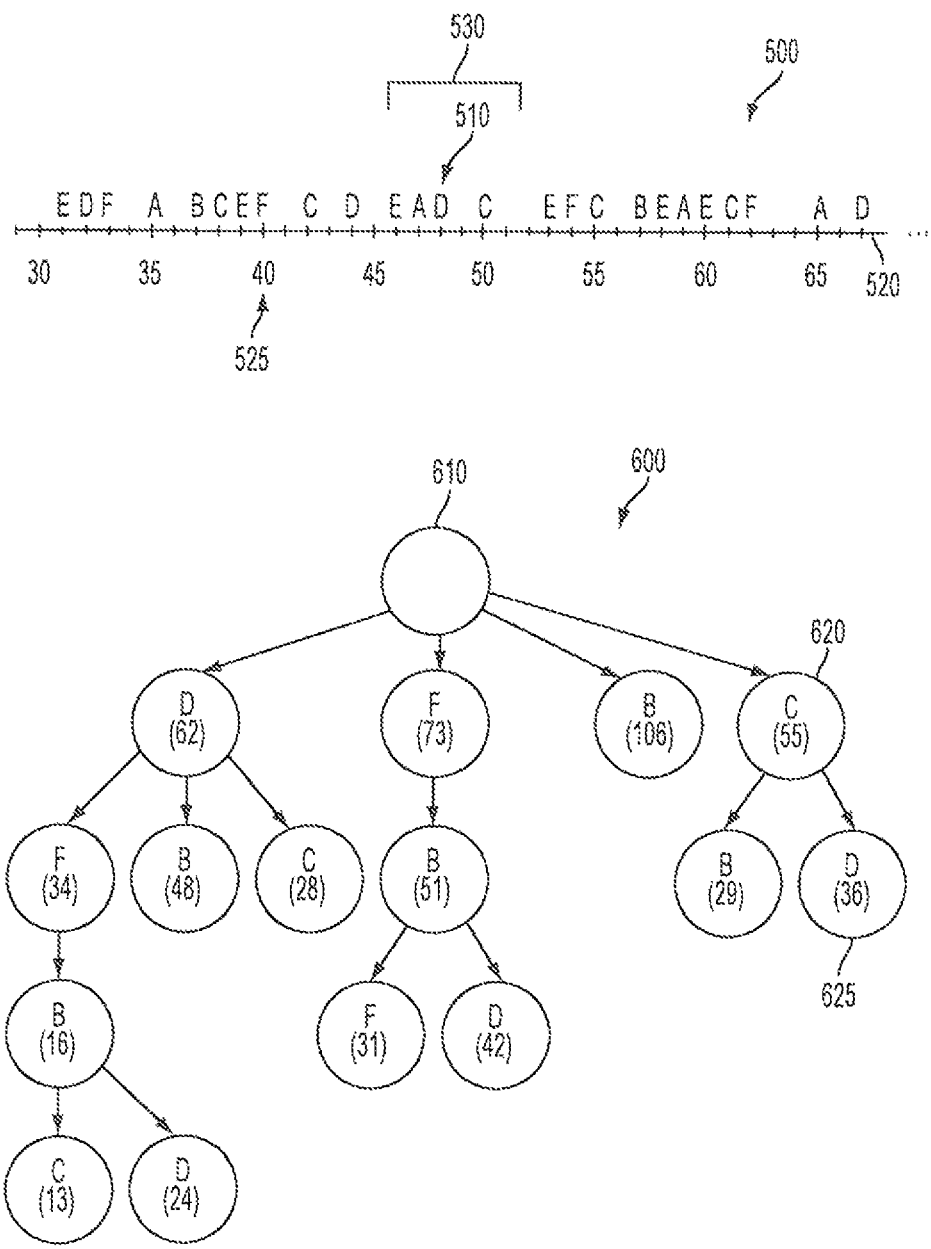
FIG. 5 is a diagram depicting an exemplary universal log file, an exemplary window, and an exemplary episode tree, consistent with certain disclosed embodiments.

FIG. 5 depicts an exemplary universal log file 500 for purposes of illustration only. In universal log file 500, individual events 510 have been depicted as letters solely for ease of illustration. Events 510 are also depicted as falling along a timeline 520 having time markers 525 to indicate when individual events 510 occurred. For example, as can be seen in FIG. 5, an event E occurred at times 31 minutes, 39 minutes, 46 minutes, 53 minutes, 58 minutes, and 60 minutes, relative to some beginning time. In FIG. 5, a window 530 is also depicted (although the window has not yet been placed anywhere in universal log file 500). Here, it can be seen that window 530 is six minutes in length, which length may have been determined by computing an average session length for a particular domain or across all domains. Notably, items depicted in FIG. 5 and other figures represent only a portion of universal log file 500, as indicated by the ellipsis.

Although log file 500 represents a universal log file containing events from multiple, different domains, FIG. 5 may depict either events across all included domains or only events specific to certain domains. This is because, as is further described below, episode trees may be constructed for both intradomain episodes and interdomain episodes from the events compiled in universal log file 500. Those skilled in the art will appreciate that FIG. 5 is depicted in a manner that is intended only for purposes of illustration. For example, timeline 520 and time markers 525 may not actually be represented in universal log file 500. Rather, as depicted in FIG. 3, each individual event record may instead include its own timestamp from which the absolute and relative temporal characteristics of events, as well as the sessions to which individual events belong, may be determined.

FIG. 5 also depicts an exemplary episode tree 600, consistent with certain disclosed embodiments. In episode tree 600, individual events are represented as nodes 620. Each node 620 that represents an event proceeds from a parent node, which may be either another event or a root node 610, which need not represent any event. Each node 630 may also contain one or more window-counts 625, which will be further discussed below.

Episode tree 600 may contain events specific to only one domain or events across multiple domains. In some embodiments, episode tree 600 may contain multiple layers, such as a first layer representing interdomain episodes and an additional layer for each domain for which intradomain episodes are stored. Thus, the episode tree configuration depicted in FIG. 5 may be used to illustrate any such layer, whether intradomain or interdomain.

Figure 4:
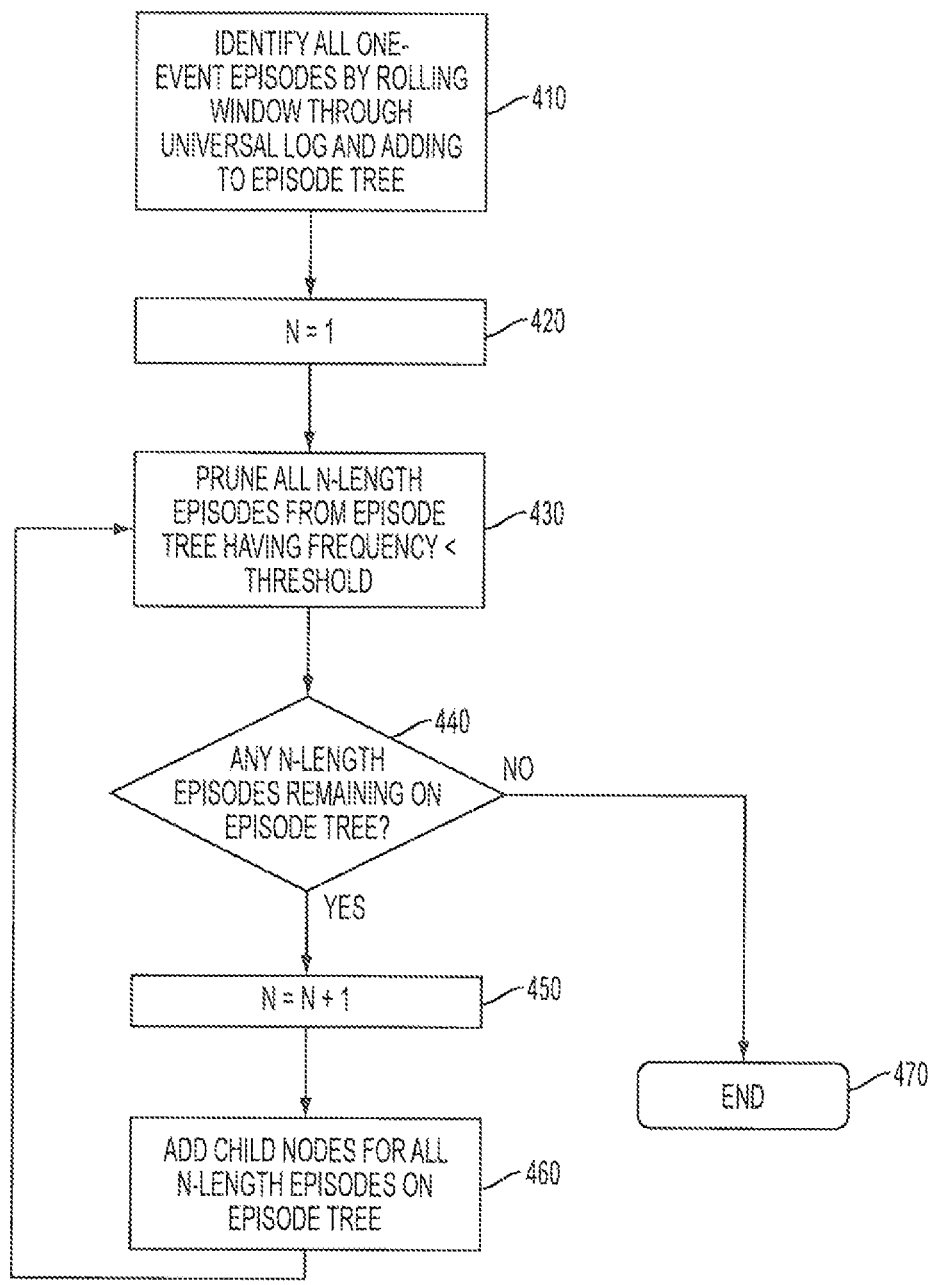
FIG. 4 is flow diagram depicting an exemplary method of identifying frequent episodes across one or more domains, consistent with certain disclosed embodiments.
Figure 6:
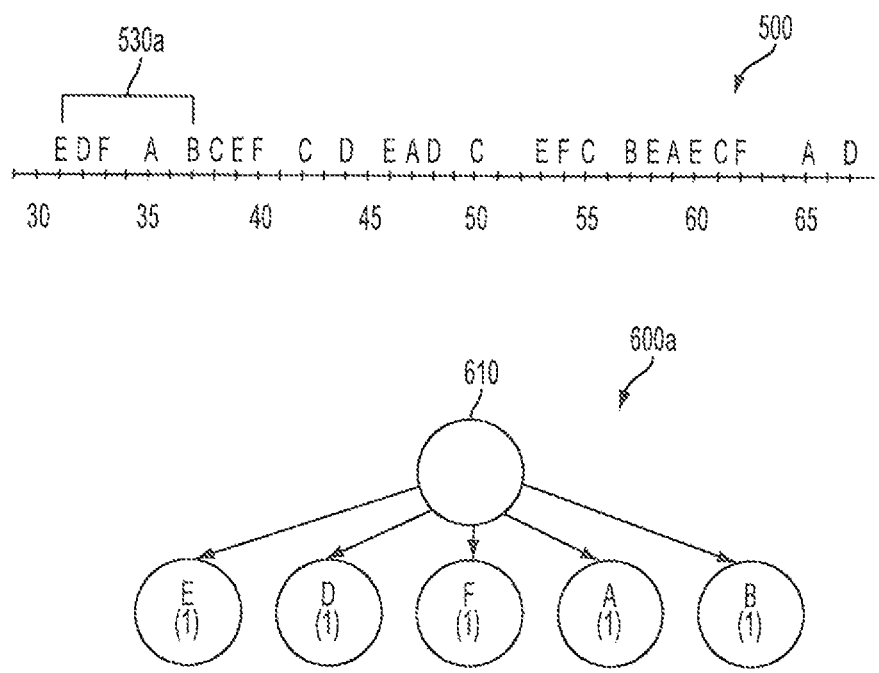
FIG. 6 is a diagram depicting an exemplary universal log file, an exemplary window placement, and an exemplary partially constructed episode tree, consistent with certain disclosed embodiments.

Turning now to FIG. 4, in step 410, system 100 may identify all one-event episodes by rolling the determined window through the universal log file and adding such episodes to an episode tree. For example, as depicted in FIG. 6, system 100 may start by placing window 530 at placement 530a, which could correspond to the beginning of universal log file 500 or the time associated with the first event in universal log file 500—here, 31 minutes. Window 530 may represent either a local window 530 at placement 530a, which could correspond to the beginning of universal log file 500 or the time associated with the first event in universal log file 500—here, 31 minutes. Window 530 may represent either a local window or a global window. In this example, because window 530 is six minutes in length, system 100 may identify all one-event episodes (or all distinct one-event episodes) in universal log file 500 that occur within the window (i.e., between 31 minutes and 37 minutes). If system 100 is looking for episodes within a specific domain, then only events within that domain will be analyzed within window placement 530a. If, however, system 100 is looking for episodes across multiple domains, then events from all such domains will be analyzed within window placement 530a. In either case, system 100 may look only at events in universal log file 500 associated with a particular user or user identity.

At this point, because system 100 is looking only at one-event episodes, the episodes found in window placement 530a will be equivalent to the set of events in window placements 530a—here, events E, D, F, A, and B. System 100 may add each of these episodes to episode tree 600 by adding nodes for events E, D, F, A, and B off of root note 610. FIG. 6 depicts episode tree 600 at stage 600a—i.e., after such nodes have been added.

Figure 7:
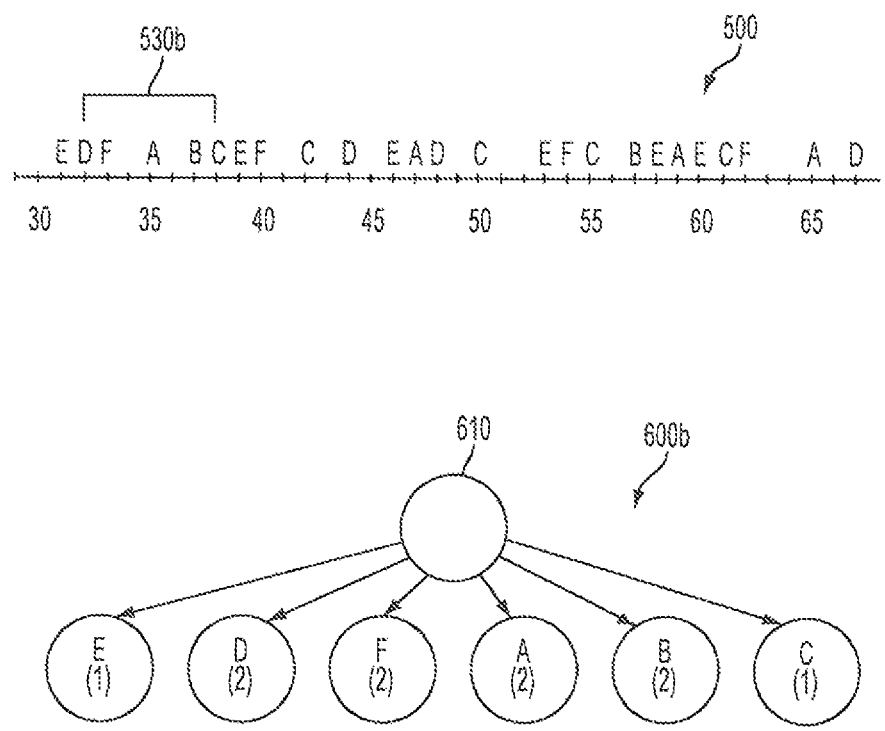
FIG. 7 is a diagram depicting an exemplary universal log file, an exemplary window placement, and an exemplary partially constructed episode tree, consistent with certain disclosed embodiments.

System 100 may then "roll" window 530 forward within universal log file 500. For example, system 100 may shift window 530 to either the next time marker or to the next event in universal log file 500. FIG. 7 depicts window 530 having been rolled forward into a new window placement 530b (i.e., from 32 minutes to 38 minutes) within universal log file 500. The above process may then be repeated to identify all distinct one-event episodes in the new window placement 530b—here, events D, F, A, B, and C. For episodes that are not already stored in episode tree 600, system 100 may add such episodes to episode tree 600. For all other episodes, system 100 may simply increment the window-count in the nodes for such episodes.

Figure 8:
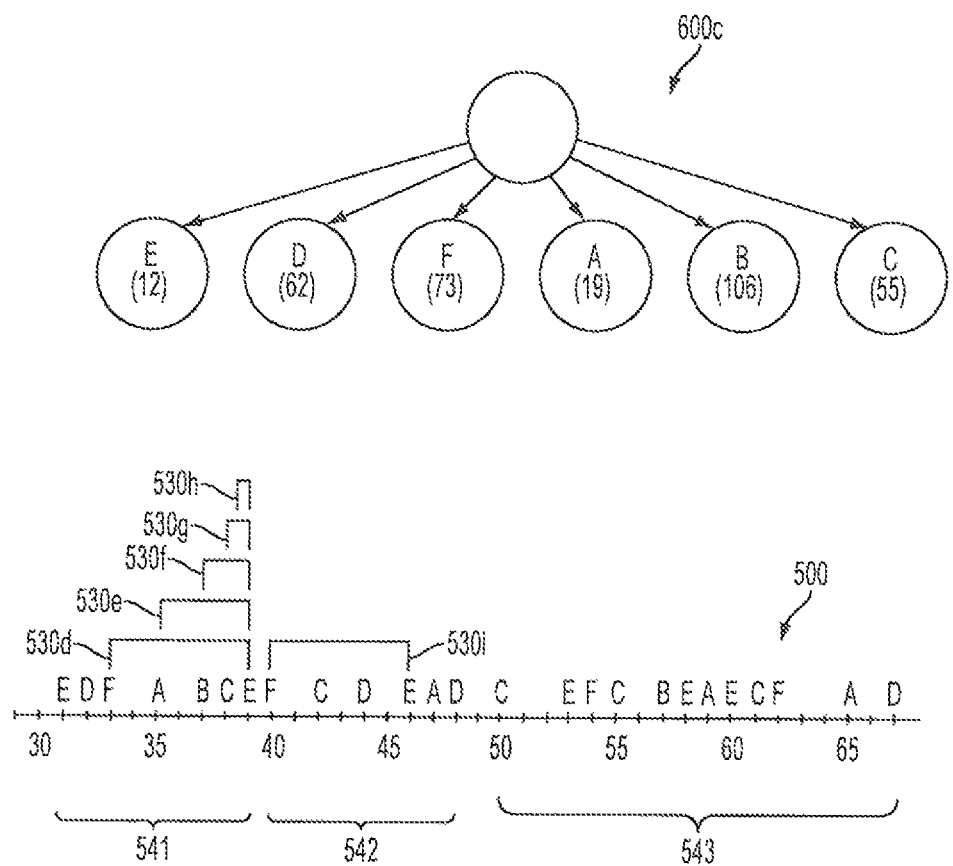
FIG. 8 is a diagram depicting an exemplary partially constructed episode tree, an exemplary universal log, file, and a series of exemplary iterative window placements conforming to an exemplary session boundary, consistent with certain disclosed embodiments.

FIG. 7 depicts episode tree 600 at stage 600b, which is after the events in window placement 530b have been analyzed. As can be seen, for event C, a new child node has been added to root node 610. For all other events in window placement 530b—namely, events D, F, A, and B—child nodes already exist. Therefore, rather than adding new nodes for these events, the window-counts for these nodes are simply incremented. Next, window 530 is rolled forward again, and the foregoing operations are repeated for the events in the new window placement. This process continues until system 100 reaches the end of universal log file 500. FIG. 8 depicts episode tree 600 at stage 600c, after window 530 has been rolled through the entire universal log file 500.

In some embodiments, rather than continuously rolling window 530 forward in the same manner for each subsequent event or time marker in universal log file 500, system 100 may ensure that window 530 never crosses session boundaries. For example, as depicted in FIG. 8, the events in universal log file 500 may fall within different sessions 541-543. Window placement 530d represents the position of window 530 once it has been rolled forward to the point that it abuts the end of a session 541. At this point, if window 530 is rolled forward again and is kept at a constant length, it will contain events from two different sessions 541 and 542. Therefore, to avoid having window 530 span multiple sessions, the length of window 530 may be incrementally reduced as it is rolled forward—e.g., as in window placements 530e-530h—until it reaches some minimum length threshold. Thereafter, window 530 may be rolled forward to analyze events in the next session, including returning to its standard size if that size is smaller than the length of the next session—e.g., as in window 530i.

Figure 9:
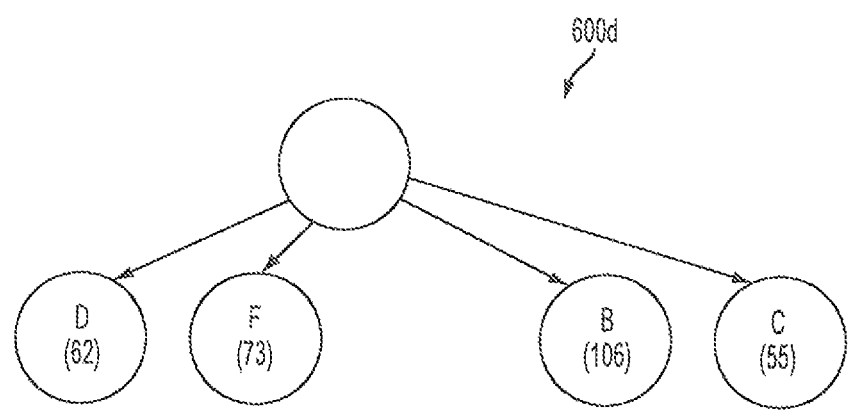
FIG. 9 is a diagram depicting an exemplary partially constructed episode tree after an exemplary pruning operation, consistent with certain disclosed embodiments.

After window 530 has been rolled through the entire universal log file 500 to identify all one-event episodes, processing may proceed to step 420, where the value of a variable N—representing the length of episodes currently under examination—is set to one. In step 430, system 100 may prune all N-length (here, one-event) episodes from the episode tree that have a frequency less than a particular threshold. For example, system 100 may divide the window count for each child node in episode tree 600c by the total number of window placements that were used when rolling window 530 through universal log file 500. Those child nodes having window-count ratios below a certain threshold may be removed from the episode tree. FIG. 9 depicts an episode tree 600 at stage 600d, in which child nodes E and A have been pruned off.

In step 440, system 100 determines whether there are any N-length (here, one-event) episodes remaining on the episode tree. If so (step 440, Yes), system 100 increments N by one (here, N=2) (step 450). Next, in step 460, system 100 adds child nodes for all N-length (here, two-event) episodes on the episode tree. Operations for step 460 may proceed as follows.

Figure 10:
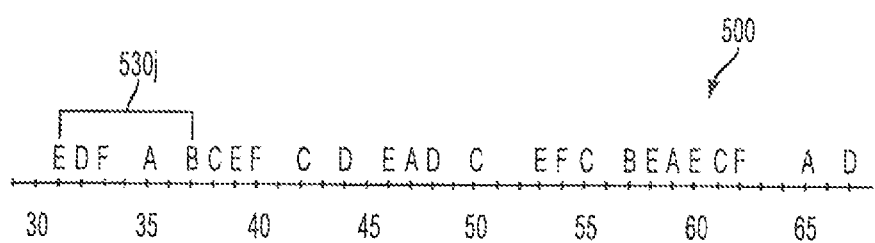
FIG. 10 is a diagram depicting an exemplary universal log file, an exemplary window placement, and an exemplary partially constructed episode tree, consistent with certain disclosed embodiments.
Figure 10:
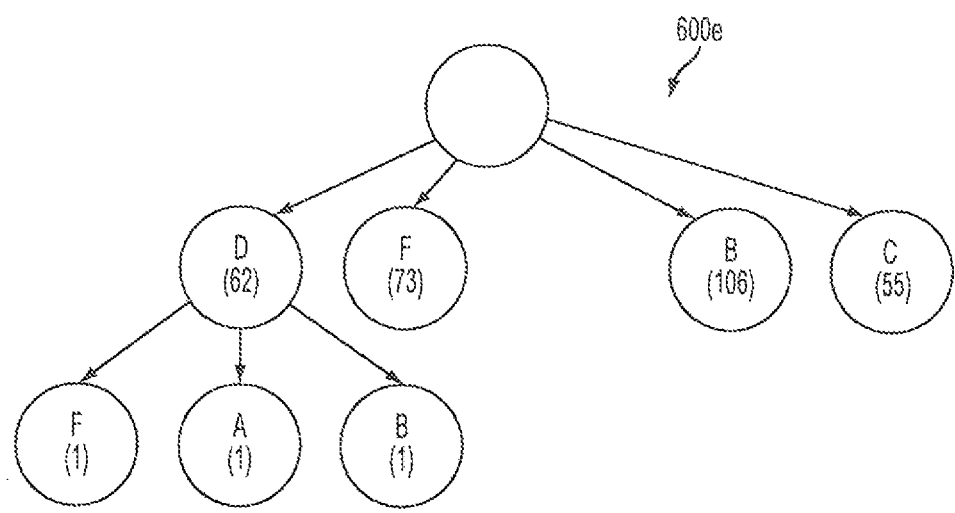

Similar to step 410, system 100 may incrementally roll window 530 through universal log file 500. For each window placement that contains an episode event-sequence that is on episode tree 600d, system 100 may identify all distinct events that follow the event-sequence. For example, FIG. 10 depicts operations during this second iteration through universal log file 500. Here, window 530 is being rolled through universal log file 500 again and has been placed toward the beginning of universal log file 500 (see window placement 530j). System 100 may look at each of the events in window placement 530j in order.

First, looking at event E, episode tree 600d does not contain any episode that begins with event E. So, event E is ignored, and attention is next turned to event D. Because there is an episode on episode tree 600d that begins with event D, system 100 adds all subsequent events (here, F, A, and B) as child nodes to child node D to create a set of two-event episodes on the episode tree. Next, because event A is not on episode tree 600d, it is ignored. Finally, event B is the last event in window placement 530j, and no events follow it in the window placement; therefore, it is ignored. FIG. 10 depicts episode tree 600 at stage 600e, after the relevant two-event episodes found in window placement 530j have been added.

As can be seen, not all two-event episodes recorded in episode tree 600e reflect consecutive series of events. For example, the episode D→B, which was found in window placement 530j, is recorded in episode tree 600e despite the fact that, in window placement 530j, event B does not directly follow event D. Thus, the algorithm described in FIG. 4 is able to capture all frequent episodes in universal log file 500, even if there are intervening events between events in the frequent episodes.

Window 530 is then rolled forward, and the foregoing operations are repeated until all relevant two-event episodes have been located within universal log file 500 and added to episode tree 600e. Next, processing returns to step 430, where system 100 prunes all N-length (here, two-event) episodes from the episode tree below a certain frequency. That minimum frequency threshold may be the same as the threshold that was used to prune one-event episodes from the episode tree or it may be different. Steps 440-460 are then repeated to identify all relevant three-event episodes in universal log file 500. Steps 430-470 will continue to repeat until no more N-length episodes can be found with a frequency greater than that of the threshold, in which case processing will end (step 470).

In some embodiments, rather than rolling window 530 through the entirety of universal log file 500 for each value of N, system 100 may store records within each event node to indicate which window placements contain the episode terminating at that event node. By doing so, system 100 would need only consult such information to determine which window placements to analyze during subsequent iterations. This enhancement would reduce the amount of data needing to be analyzed in each subsequent iteration. In any event, because N+1-length episodes are analyzed only for N-length episodes remaining on episode tree 600, the algorithm of FIG. 4 may reduce to complexity O (N log N), a dramatic improvement over conventional pattern-searching algorithms.

Figure 11:
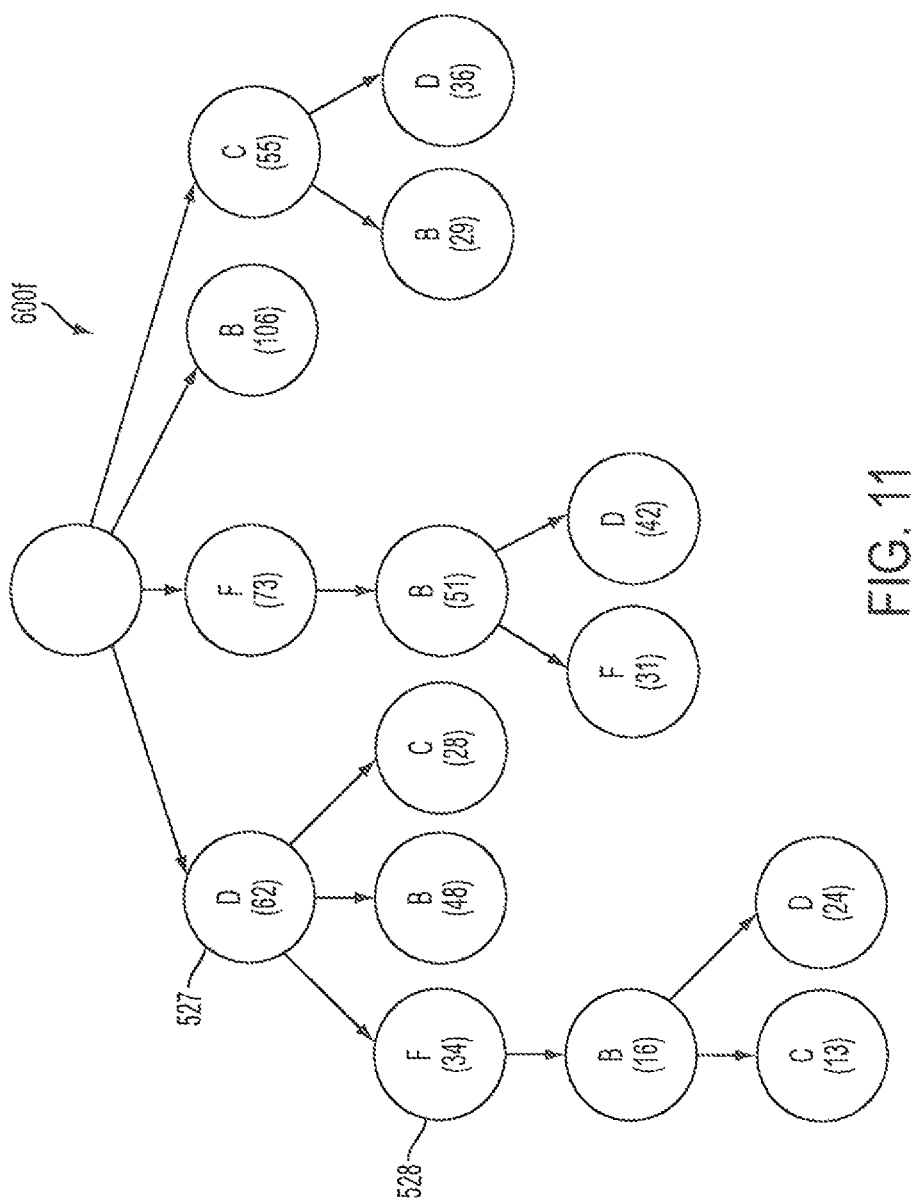
FIG. 11 is a diagram depicting an exemplary fully constructed episode tree, consistent with certain disclosed embodiments.

Once processing has completed, episode tree 600 will represent all episodes found in universal log file 500 that occur with the requisite amount of frequency. FIG. 11 depicts an exemplary final episode tree 600f. As can be seen, in episode tree 600f, a particular event sequence may be represented both as a complete episode (e.g., as in episode F→B→D) and as a subset within a larger episode (e.g., as in episode D→F→B→D). Also, as can be seen, an episode may contain a particular event twice (e.g., as in episode F→B→F). Those skilled in the art will appreciate that a final episode tree 600f may be represented in other ways.

Returning to FIG. 2, in step 240, once an episode tree has been built, system 100 can then analyze the episode tree to identify episode probability rules. For example, as depicted in FIG. 11, one of the episodes represented on final episode tree 600f is the event sequence DFBC. By dividing the window-count for node D (item 527) by the total number of window placements rolled through universal log file 500, system 100 can determine the likelihood that the one-event episode D will occur. For example, if the total number of window placements rolled through universal log file 500 is 153, then there is a 62/153=41% likelihood that episode D will occur in any given future session. Moreover, by dividing the window-count of child node 528 by the window count of parent node 527, system 100 can determine that if event D occurs in a given session, then there is a 34/62=55% likelihood that event F will follow. Or, by combining percentages, system 100 can determine that there is a 41%×55%=22% likelihood that episode D→F will occur in a given future session.

Expanding these concepts to the entire D→F→B→C episode, the following metrics may be determined:

In any Given T-Minute Session

| Episode | Will Occur with Probability |
|---|---|
| D | 41% |
| D→F | 22% |
| D→F→B | 10% |
| D→F→B→C | 8% |

And

| IF | THEN | WITHIN | WITH |
|---|---|---|---|
| Event D occurs | event F will occur | T minutes | 55% confidence |
| Event sequence D→F occurs | event B will occur | T minutes | 47% confidence |
| Event sequence D→F→B occurs | Event C will occur | T minutes | 81% confidence |

In step 250, these determined probabilities may then be applied to future interactions with customers. For example, the events D, F, B, and C might represent the following events. Event D might represent a user making a loan payment using a mobile application, where the payment that is made exceeds the minimum payment required for the loan. Because the user has made more than the minimum payment, the amount of time or the number of payments needed to pay off the balance of the loan may change from a previously issued payoff schedule. Accordingly, event F might represent the user making an HTTP request for the dynamic webpage/accounts/payoff_schedule.aspx, which may be used to present to a user the estimated amount of time or number of payments needed to pay off the balance of a given loan. However, that dynamic webpage may be coded such that it calculates a new payoff schedule only after a payment is actually credited by the user's bank, rather than immediately after the payment transaction is initiated online.

Event B may represent the user requesting the static webpage /help/FAQ/payoff_schedule.htm. This webpage may present answers to various frequently asked questions about payoff schedules. In this case, the user may have requested that webpage after he first consulted the dynamic webpage of event F and noticed that the payoff schedule associated with his loan did not change despite his having just made a payment larger than the required minimum payment. That static webpage may contain information meant to inform the user that new payoff schedules are not calculated until payments are actually credited and that the user would need to call the call center to obtain a new payoff schedule if one were desired before that time. Finally, event C may represent the user calling the call center to request a new payoff schedule.

In this example, the probability rules derived from the completed episode tree may be used to anticipate certain user actions in order to obviate the need for the user to call the call center. For example, even though, by itself the episode D→F→B→C has only an 8% likelihood of occurring in a given user session, the episode tree reveals that if the event sequence D→F→B does occur, then there is a very strong likelihood—81%—that event C will follow. Knowing this information, the service provider may configure its service portals such that if the event sequence B→F→B occurs, a preliminary new loan payoff schedule is emailed to the user within time T (i.e., six minutes). By preemptively pushing such information to the user within this timeframe, the service provider may make it less likely that users will call the call center to request new loan payoff balances (i.e., perform event C), and thus reduce operational costs. Thus, by employing the disclosed embodiments, a service provider may optimize its portal features by making use of identified interdomain episodes.

The foregoing example of using identified interdomain episodes to improve system operation is only one example. Those skilled in the art will appreciate that identified intra-domain or interdomain episode rules may be used for countless other purposes, including, for example, evaluating the effectiveness of certain programs or portal features, redesigning the organization or flow of various portals (e.g., shifting certain features between different portals) to better align with frequent episodes, and better directing users to appropriate service personnel when calls or chats are initiated to certain portals.

The foregoing description of the invention, along with its associated embodiments, has been presented for purposes of illustration only. It is not exhaustive and does not limit the invention to the precise form disclosed. Those skilled in the art will appreciate from the foregoing description that modifications and variations are possible in light of the above teachings or may be acquired from practicing the invention. The steps described need not be performed in the same sequence discussed or with the same degree of separation. Likewise various steps may be omitted, repeated, or combined, as necessary, to achieve the same or similar objectives or enhancements. Accordingly, the invention is not limited to the above-described embodiments, but instead is defined by the appended claims in light of their full scope of equivalents.

What is claimed is:

1. A computer-implemented method of identifying frequently occurring episodes comprising:
    collecting records of events in a log file, the events representing actions taken by one or more users within a plurality of service portals, wherein the records of events in the log file are in a plurality of formats corresponding to the plurality of service portals;
    converting the records of events in the log file into a standard format;
    identifying a first average user session length within a single service portal of the plurality of service portals;
    determining a first window comprising a first timespan, wherein the first timespan is based on the first average user session length within the single service portal;
    identifying, by a processor, a plurality of intradomain episodes represented in the log file, wherein each intradomain episode comprises a plurality of events corresponding to the single service portal of the plurality of service portals occurring within the first window;
    identifying a second average user session length across at least two different types of service portals of the plurality of service portals, the at least two different types of service portals selected from the group consisting of a Hypertext Transfer Protocol (HTTP) service portal, a mobile application service portal, a call center service portal, a chat service portal, an application server service portal, and a paper-based workflow service portal;
    determining a second window comprising a second timespan, wherein the second timespan is based on the second average user session length across the at least two different types of service portals; and
    identifying, by the processor, a plurality of interdomain episodes represented in the log file, wherein each interdomain episode comprises a second plurality of events corresponding to actions, occurring within the second window, taken by a single user identity across the at least two different types of service portals.

2. The method of claim 1, wherein identifying the plurality of interdomain episodes represented in the log file comprises:
    placing the second window at a position associated with each event in the log file; and
    for each window position, analyzing events within the second window to identify one or more event patterns.

3. The method of claim 1, wherein:
    the plurality of events in an intradomain episode correspond to actions taken by the single user identity; and
    the intradomain episode is defined by an occurrence of certain events.

4. The method of claim 1, wherein:
    an interdomain episode is defined by an occurrence of certain time gaps between events.

5. The method of claim 1, wherein identifying the average second user session length comprises:
    identifying a plurality of user sessions according to time-gaps between the user sessions having lengths greater than a specified threshold; and
    computing the second average user session length based of the plurality of user sessions.

6. The method of claim 1, further comprising:
    adding a plurality of episodes occurring within the second window to an episode tree data structure.

7. The method of claim 6, further comprising:
    removing episodes from the episode tree having a frequency less than a specified threshold.

8. The method of claim 6, further comprising:
    adding all distinct one-event episodes in the log file to the episode tree; and
    removing one-event episodes having a frequency less than a specified threshold.

9. The method of claim 8, further comprising:
    for each distinct combination of an N-event episode on the episode tree and an event occurring subsequent to the episode within a same window placement as the episode, adding the event to the episode tree to generate an (N+1)-event episode on the episode tree; and
    removing (N+1)-event episodes from the episode tree having a frequency less than a specified threshold.

10. The method of claim 9, further comprising:
    repeating the steps set forth in claim 9 for incremental values of N, from N=1 until no N-event episodes are found in the log file having a frequency greater than or equal to a specified threshold.

11. The method of claim 6, further comprising:
    determining one or more probability rules concerning whether one or more episodes will occur in a future user session based on the episode tree.

12. The method of claim 11, further comprising:
    applying the one or more probability rules to future interactions with users.

13. A system configured to identify frequently occurring episodes comprising:
    a processing system comprising one or more processors; and
    a memory system comprising one or more computer-readable media, wherein the computer-readable media contain instructions stored thereon that, when executed by the processing system, cause the processing system to perform operations comprising:
        collecting records of events in a log file, the events representing actions taken by one or more users within a plurality of service portals, wherein the records of events in the log file are in a plurality of formats corresponding to the plurality of service portals;
        converting the records of events in the log file into a standard format;
        identifying a first average user session length within a single service portal of the plurality of service portals;
        determining a first window comprising a first timespan, wherein the first timespan is based on the first average user session length within the single service portal;
        identifying, by a processor, a plurality of intradomain episodes represented in the log file, wherein each intradomain episode comprises a plurality of events corresponding to the single service portal of the plurality of service portals occurring within the first window;

identifying a second average user session length across at least two different types of service portals of the plurality of service portals, the at least two different types of service portals selected from the group consisting of a Hypertext Transfer Protocol (HTTP) service portal, a mobile application service portal, a call center service portal, a chat service portal, an application server service portal, and a paper-based workflow service portal;

determining a second window comprising a second timespan, wherein the second timespan is based on the second average user session length across the at least two different types of service portals; and identifying, by the processor, a plurality of interdomain episodes represented in the log file, wherein each interdomain episode comprises a second plurality of events corresponding to actions, occurring within the second window, taken by a single user identify across the at least two different types of service portals.

14. The system of claim 13, wherein identifying the plurality of interdomain episodes represented in the log file comprises:

placing the second window at a position associated with each event in the log file; and for each window position, analyzing events within the second window to identify one or more event patterns.

15. The system of claim 13, wherein:

the plurality of events in an intradomain episode correspond to actions taken by the single user identity; and the intradomain episode is defined by an occurrence of certain events.

16. The system of claim 13, wherein:

an interdomain episode is defined by an occurrence of certain time gaps between events.

17. The system of claim 13, wherein identifying the average second user session length comprises:

identifying a plurality of user sessions according to time-gaps between the user sessions having lengths greater than a specified threshold; and computing the second average user session length based of the plurality of user sessions.

18. The system of claim 13, the operations further comprising:

adding a plurality of episodes occurring within the second window to an episode tree data structure.

19. The system of claim 18, the operations further comprising:

removing episodes from the episode tree having a frequency less than a specified threshold.

20. The system of claim 18, the operations further comprising:

adding all distinct one-event episodes in the log file to the episode tree; and removing one-event episodes having a frequency less than a specified threshold.

21. The system of claim 20, the operations further comprising:

for each distinct combination of an N-event episode on the episode tree and an event occurring subsequent to the episode within a same window placement as the episode, adding the event to the episode tree to generate an (N+1)-event episode on the episode tree; and removing (N+1)-event episodes from the episode tree having a frequency less than a specified threshold.

22. The system of claim 21, the operations further comprising:

repeating the steps set forth in claim 21 for incremental values of N, from N=1 until no N-event episodes are found in the log file having a frequency greater than or equal to a specified threshold.

23. The system of claim 18, the operations further comprising:

determining one or more probability rules concerning whether one or more episodes will occur in a future user session based on the episode tree.

24. The system of claim 23, the operations further comprising:

applying the one or more probability rules to future interactions with users.

* * * * *